Figure 1:
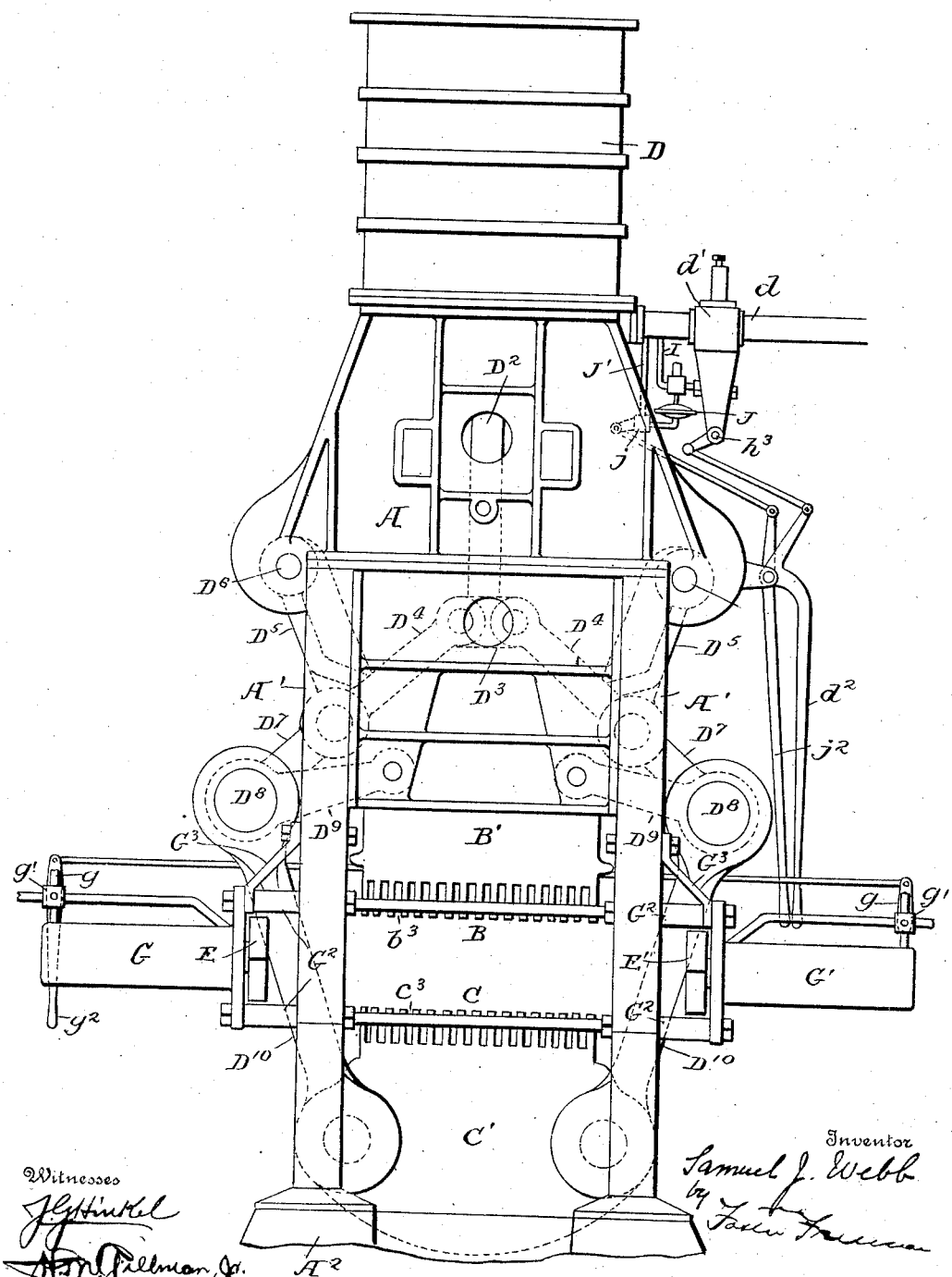

No. 868,738. PATENTED OCT. 22, 1907.
S. J. WEBB.
MEANS FOR CHANGING THE SHAPES OF AND COMPRESSING BALES.
APPLICATION FILED NOV. 28, 1900.

4 SHEETS—SHEET 1.

Witnesses
Inventor
Samuel J. Webb
Attorneys

No. 868,738. PATENTED OCT. 22, 1907.
S. J. WEBB.
MEANS FOR CHANGING THE SHAPES OF AND COMPRESSING BALES.
APPLICATION FILED NOV. 28, 1900.
4 SHEETS—SHEET 2.
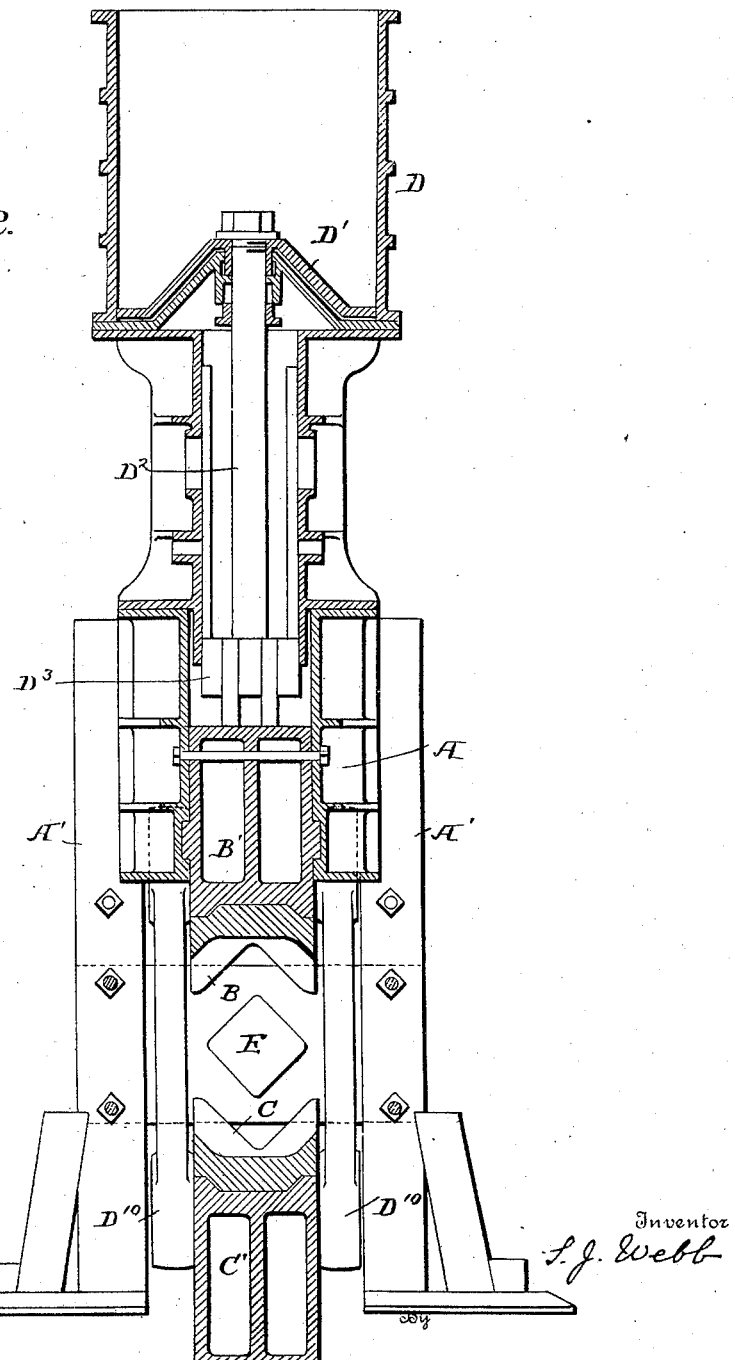

No. 868,738.
PATENTED OCT. 22, 1907.
S. J. WEBB.
MEANS FOR CHANGING THE SHAPES OF AND COMPRESSING BALES.
APPLICATION FILED NOV. 28, 1900.
4 SHEETS—SHEET 3.
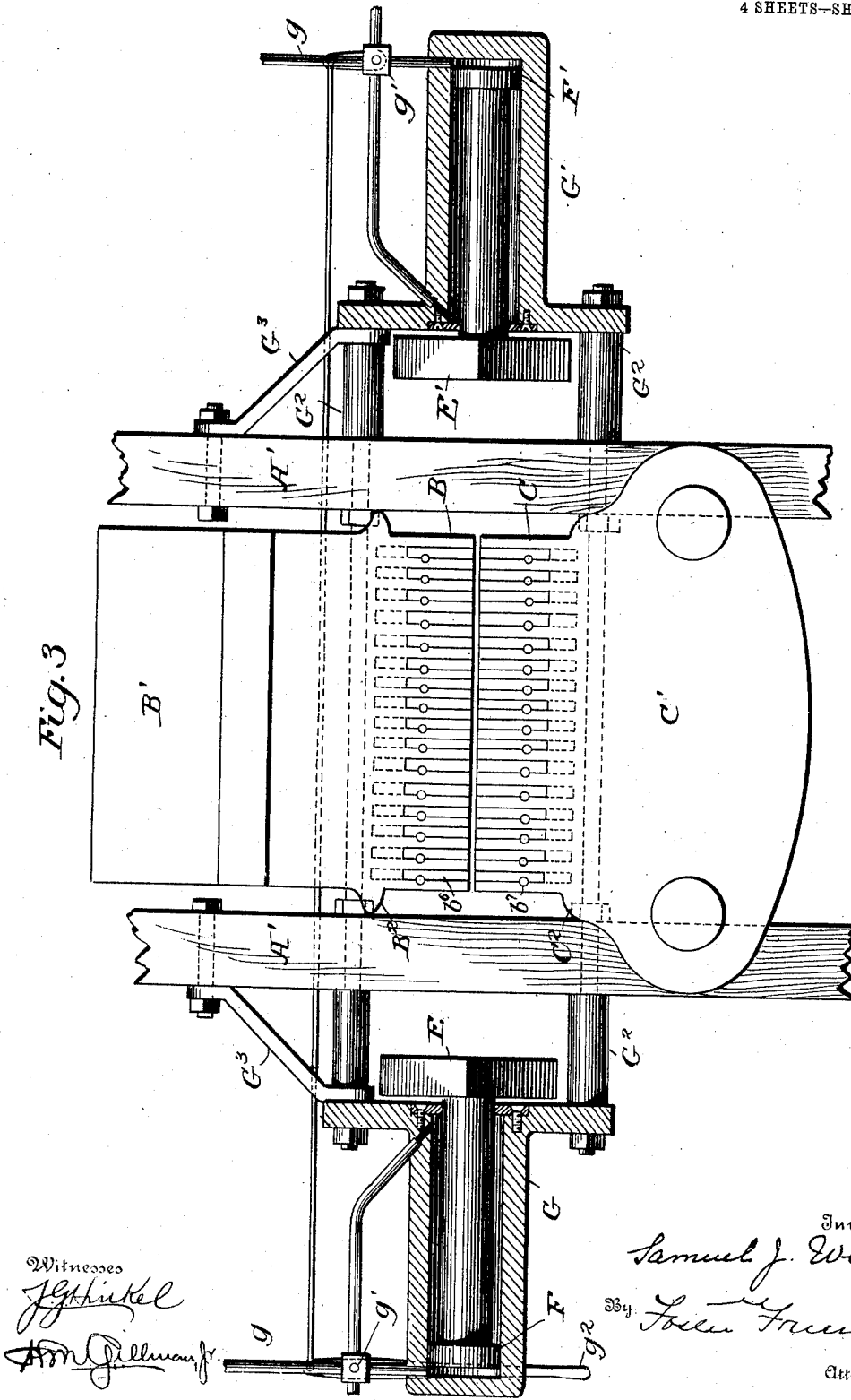

No. 868,738. PATENTED OCT. 22, 1907.
S. J. WEBB.
MEANS FOR CHANGING THE SHAPES OF AND COMPRESSING BALES.
APPLICATION FILED NOV. 28, 1900.
4 SHEETS—SHEET 4.
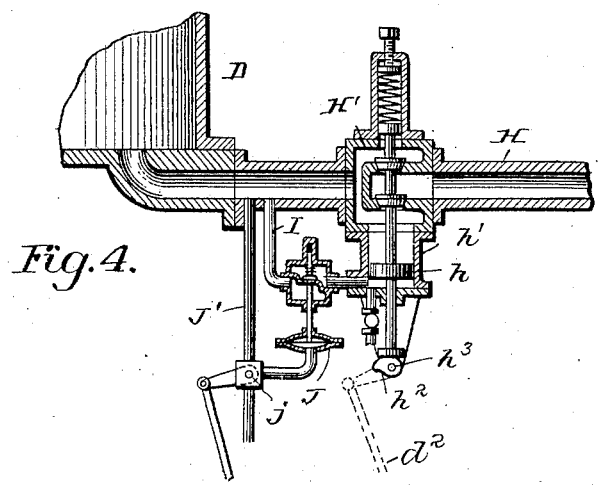
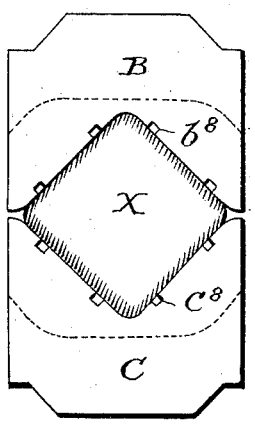
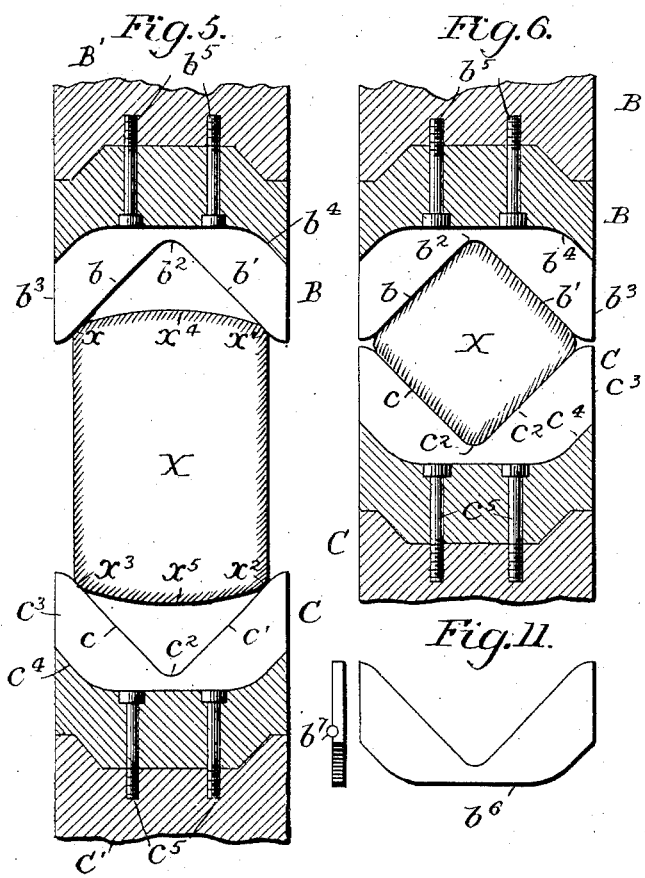
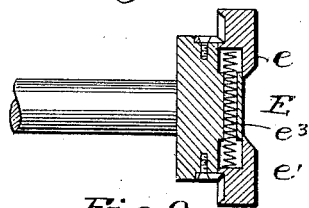
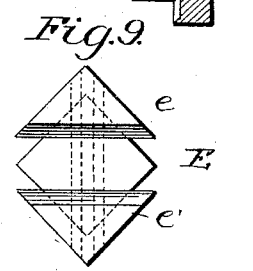
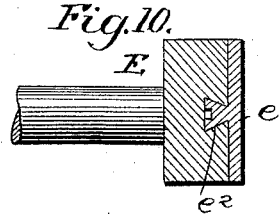
Inventor
Samuel J. Webb
Witnesses

UNITED STATES PATENT OFFICE.

SAMUEL J. WEBB, OF MINDEN, LOUISIANA.

MEANS FOR CHANGING THE SHAPES OF AND COMPRESSING BALES.

No. 868,738.          Specification of Letters Patent.          Patented Oct. 22, 1907.

Application filed November 28, 1900. Serial No. 38,023.

*To all whom it may concern:*

Be it known that I, SAMUEL J. WEBB, a citizen of the United States, residing at Minden, in the parish of Webster and State of Louisiana, have invented certain new and useful Improvements in Means for Changing the Shape of and Compressing Bales, of which the following is a specification.

My invention relates to compresses of that class which are adapted more especially for compressing bales of cotton and similar material, and the object of my invention is to provide means whereby the shape of the bale can be changed and the bale compressed, and to these ends my invention consists in the various means, constructed, combined and arranged to operate substantially in the manner hereinafter more particularly set forth.

In the accompanying drawings: Figure 1 is a side view of a lever press embodying my invention; Fig. 2 is a transverse section of the same; Fig. 3 is a partial sectional view showing more particularly the means for operating the pressing heads; Fig. 4 is a sectional view of the exhaust valve; Fig. 5 is an enlarged sectional view of the dies, showing them in position to receive a bale; Fig. 6 is a similar view showing the dies closed; Fig. 7 is a transverse section of the dies, showing the longitudinal slots; Figs. 8, 9 and 10 are detail views of a pressing head, and Fig. 11 is a side and end view of the filling pieces.

In my application, Serial No. 36,886, filed Nov. 17, 1900, I have described and claimed an improved method of changing the shape of and compressing bales of cotton and similar material, and the primary object of my present invention is to provide means specially adapted to carry out the method set forth in said application. It is evident that my invention is not limited to such use and that the various elements and combinations hereinafter set forth may be used for other purposes of which they are capable.

The main features of my present improvement embody improved platens or dies for use in a compress, so arranged that they may be utilized to first change the shape of the bale and compress it, and other features of the invention are certain attachments to a compress by means of which the bale may be compressed longitudinally after being compressed in two transverse directions, and further the apparatus may be utilized in compressing bales without removing the bands, or for any other purpose for which it is or may be adapted without departing from the general principles of construction and arrangement hereinafter set forth.

In my said application before referred to I have described and claimed a method of changing the shape of bales, consisting generally stated of applying pressure to the edges of the bale tending to compress the material of the bale towards its center, thus changing the shape, so that the parts which in the beginning of the operation formed the edges of the bale become merged into the sides of the bale, and the edges of the finished bale are substantially in the relative positions of the centers of the sides in the beginning. This changed shape of bale is then compressed until it is brought to a form in which it is practically square in cross-section, and the bale banded or otherwise treated, and as above intimated the means which I am about to describe are specially adapted to carry out this method and will be described when so utilized, without limiting the invention to this particular use.

The platens or dies are, broadly stated, each provided with two compressing faces arranged at an angle to each other, these compressing faces uniting with each other on their adjacent edges at a position which corresponds to one of the edges of the bale as finally compressed. Such platens or dies may be arranged in and operated by various kinds or styles of compresses, operated either by steam, hydraulic or lever mechanism, and in the present instance I shall show them as applied to what is known as a compound lever press. Such a lever press is fully set forth in my application Serial No. 720,850, filed June 16, 1899, and I do not deem it necessary to describe it herein with the same particularity as I did in that application, but will describe it briefly so as to enable those skilled in the art to understand the same.

The press comprises a suitable frame, A, mounted upon suitable posts, A', which in turn are mounted on a foundation $A^2$, and this frame, A, supports the stationary platen, B', having a die or working face, B, and there is another movable die or working face, C, supported on a movable platen, C'. Mounted upon or connected with the frame is a cylinder, D, in which moves a piston, D', and to which cylinder steam is supplied through a pipe, $d$, controlled by a valve, $d'$, which may be operated in any suitable way, as through the operating lever, $d^2$, and suitable connections between the same and the valve. The piston-rod, $D^2$, is provided with a cross-head, $D^3$, operating in suitable guides in the frame, A, and connected to the cross-head are links, $D^4$, connected to swinging arms, $D^5$, the other ends of which arms are pivoted at $D^6$ to the frame, A. Also connected to the links, $D^4$, are the links, $D^7$, the other ends of which are connected to pins, $D^8$, which pins are mounted on levers, $D^9$, the inner ends of which are pivoted to the frame, A. Also mounted on the pins, $D^8$, are the lifting rods, $D^{10}$, the lower ends of which are connected to the lower platen, C. With this arrangement it will be readily understood that when the piston, D', is raised through the operation of the levers, links and connecting rods the lower platen is moved upward toward the fixed platen under great power to compress the material between the platens, and when the steam is exhausted from the cylinder, D, and the piston returns to the position shown more particularly in Fig. 2, the lower platen returns to what may be called its normal position, shown in Figs. 1 and 2.

The dies or jaws, B and C, which are shown in detail in Figs. 5 and 6, are adapted in any suitable way to be detachably secured to the upper and lower platens, B', C', respectively, although in some instances they may be made as integral parts of said platens, and in the present instance I have shown them secured by bolts or screws in a manner well understood.

The operating or compresing faces, $b$, $b'$, and $c$, $c'$, of these dies are formed at an angle to each other, with their adjacent edges meeting, as at the points, $b^2$, $c^2$.

In order that the bands may be applied to a compressed bale while under pressure between the jaws or dies, slots $b^3$, $c^3$, are provided in the faces of the jaws, and these slots extend to a depth beyond the points, $b^2$, $c^2$, as indicated by the letters, $b^4$, $c^4$, and the screws or bolts $b^5$, $c^5$, when used to secure the dies or jaws to the platens are preferably passed through holes extending from the bottoms of the slots, as indicated. Sometimes it is desirable to use these dies or jaws without the slots, and in order to do this I provide filling pieces, as $b^6$, which are so shaped as to fit in the slots $b^3$, and to be secured therein either by friction or by some suitable device, as for instance the pins, $b^7$, and, of course, similar filling pieces will be arranged to fill the slots, $c^3$, in the die, C. In utilizing these dies or jaws in carrying out the method of my application before referred to, a bale, as for instance, an ordinary plantation bale, X, is placed in the compress between the dies with its edges $x$, $x'$, $x^2$, $x^3$, bearing on the respective compressing faces, $b$, $b'$, $c'$, $c$, as indicated in Fig. 5. As the dies are caused to approach each other the portions $x^4$, $x^5$, of the sides of the bale gradually approach the points, $b^2$, $c^2$, so that the portions $x^4$, $x^5$, become the edges of the compressed bale, as indicated in Fig. 6, and the material at the corners $x$, $x^3$, and $x'$, $x^2$, approach each other to form the other edges of the rectangular, compressed bale, as indicated in Fig. 6.

When the bale is compressed to the form shown in Fig. 6, the bands can be applied by passing them through the slots, $b^3$, $c^3$, and the bale banded while under pressure on all four of its sides. After the bale has been compressed on its four sides, as above described, in some instances it is desirable to compress it longitudinally, that is, in the direction of its length, and while confined or supported between the dies, B, C. When this is done the filling pieces, $b^6$, should be placed in position to fill the slots, $b^3$, and similar filling pieces be placed in the slots, $c^3$, so that the dies will present practically smooth surfaces and permit the bale to be further condensed by pressure in the direction of its length. In order to accomplish this I provide suitable platens or compressing heads, E, E', of a shape to correspond with the cross-section of the bale, and these heads may be operated in any suitable way, and in the present instance I have shown the heads as being attached to pistons, F, F', working in hydraulic cylinders, G, G', attached to the frame or posts of the press by any suitable means, as the bolts or rods, $G^2$, and preferably suitable brace rods, $G^3$, are also used to maintain the parts in position. The hydraulic cylinders, G, G', are supplied with fluid through a suitable pipe, $g$, controlled by a valve, $g'$, and operating lever, $g^2$. While these platens or pressing heads, E, E', may be solid, as indicated in Fig. 3, I preferably construct them substantially as indicated in Figs. 8, 9 and 10, in which each head, as E, is provided with two sliding face pieces, $e$, $e'$, which are arranged to slide in the head in any suitable way, as by dove-tailed tongue and groove, $e^2$, and suitable means, as a spring, $e^3$, is arranged to normally press the face pieces, $e$, $e'$, apart so that the heads will automatically adjust themselves to completely fill the space between the compressing faces of the dies B and C, and thus the heads are adapted to press the ends of bales having various cross-sectional areas.

In order to cause the face pieces, $e$, $e'$ to freely enter between the compressing faces of the dies, B and C, I preferably provide projections, $B^2$, $C^2$, on the ends of the dies, or some other similar means which will insure the pressing heads entering the space between the dies.

When it is desired to band the bale in the direction of this longitudinal pressure the compressing faces of the dies, B, C, may be provided with longitudinal grooves, $b^8$, $c^8$, and it will be understood that one or both of the pressing heads, E, E', may be operated to compress the bale longitudinally, or one of them may be brought into position against one end of the compressed bale and act as a confining plate or abutment while the bale is being compressed longitudinally by the movement of the other pressing head, and then the complete, finished bale will be near one end of the dies or jaws, B, C, and can be readily banded and tied in the direction of this last or longitudinal compression.

In actual practice I have found that while in order to compress a bale of cotton to a certain density it may require a certain pressure per square inch of surface, after the bale has been compressed to such density it can be held or maintained at that density by a much less pressure per square inch; or in other words, after the bale has been compressed to a certain density it can be held and maintained at that density by a pressure upon the bale of about one-fourth the pressure per square inch required to attain the density. Thus in the present apparatus, after the bale has been compressed to a certain density between the dies, B, C, and it is desired to further compress it longitudinally the bale may be maintained at that density under a much less pressure at its sides. Further, it is well known that the friction on a moving surface, other things being equal, is proportionate to the weight pressing on the material, and in order to relieve the friction on the bale when it is being compressed longitudinally I provide means for relieving the pressure upon the dies, B, C. To do this in the present instance I connect with the exhaust pipe, H, of the cylinder, D, an exhaust valve, H', which is provided with a piston, $h$, working in a cylinder, $h'$, in the valve casing, and this valve is adapted to be operated in the usual way by a cam, $h^2$, on a shaft, $h^3$, operated by the operating lever, $d^2$. Further, to accomplish the result just stated I provide a by-pass, I, extending from the pipe, H, or the cylinder, D, to the cylinder, $h'$, of the valve casing, and connect with said pipe a pressure regulator, J, shown as being of the well-known diaphragm construction, and this is also connected to the pipe, H, or the cylinder, D, by a pipe, J', having a valve, $j$, to control the flow of fluid to the pressure regulator J. This valve can be operated in any suitable way, as by the operating lever, J², and when this valve is opened steam is admitted to the pressure regulator, J, which in a manner well understood controls the fluid passing through the by-pass I, to the cylinder, h', of the valve casing, and thus automatically controls the position of the exhaust valve, H', and reduces the pressure in the cylinder, D, to a certain predetermined amount, which is the necessary amount to hold the dies, B, C, in position to maintain the density already produced by the operation of said dies. Thus it will be seen that after the bale is compressed on its sides, by this arrangement the pressure on the dies can be relieved to a greater or less extent and the dies maintained in position while the bale is being compressed in the direction of its length and banded or otherwise secured, and then by operating the valve, H', by the operating lever, d², the fluid can be completely exhausted from under the piston, D', and the piston will then return to its normal position, and through its connecting mechanism restore the movable platen to its normal position.

What I claim is:

1. In a compress, the combination with platens, each having two opposing compressing faces at an angle to each other and adapted to receive a bale between them with its edges meeting said faces, of means for operating one of said platens to bring it toward the other to form new sides for the bale and to compress said sides, substantially as described.

2. In a compress, the combination with platens, each having two opposing compressing faces at an angle to each other and adapted to receive a bale between them with its edges meeting said faces, of means for moving one platen toward the other to compress the bale on its edges to form new sides, and means whereby the bale may be banded while under compression on four sides, substantially as described.

3. In a compress, the combination with platens, each having two opposing compressing faces at substantially a right angle to each other and adapted to receive a bale placed between the platens with its edges meeting said faces, of means for moving the platens toward each other, to compress the bale on its edges to change the form of the bale and to form a bale having a practically square cross-section, substantially as described.

4. In a compress, the combination with platens, each having two opposing compressing faces at an angle to each other and adapted to receive and compress a bale, of pressing heads arranged to compress the bale longitudinally while confined between said platens, substantially as described.

5. In a compress, the combination with platens, each having two opposing compressing faces at an angle to each other and adapted to receive and compress a bale, of pressing heads having expansible faces arranged to compress the bale longitudinally while confined between said platens, substantially as described.

6. In a compress, the combination with platens, each having two opposing compressing faces at an angle to each other and adapted to receive and compress a bale, of pressing heads arranged to compress the bale longitudinally while confined between said platens, and means for operating the platens and heads, substantially as described.

7. In a compress, the combination with platens, of a cylinder for operating said platens to compress a bale, an exhaust valve connected to said cylinder, and means connected to said exhaust valve for automatically controlling the pressure in the cylinder and upon the platen, substantially as described.

8. In a compress, the combination with platens, of a cylinder for operating them to compress a bale, an exhaust valve connected to said cylinder, a pressure regulator connected to said exhaust valve for automatically controlling the pressure in the cylinder and upon the platen, substantially as described.

9. In a compress for bales, the combination with platens provided with grooves, movable filling pieces to fit the grooves, and longitudinal pressing heads, substantially as described.

10. In a compress for bales, the combination with the platens, each platen having two compressing surfaces at an angle to each other and provided with grooves, of movable filling pieces to fit the grooves, and longitudinal compressing heads, substantially as described.

11. In a compress for bales, the combination with the platens, each platen having two compressing surfaces at an angle to each other and provided with grooves, of movable filling pieces to fit the grooves, and adjustable longitudinal compressing heads, substantially as described.

12. In a press having pressing surfaces to inclose the four sides of a bale, a pressing head adapted to work between the said surfaces and means for operating the pressing head, substantially as described.

13. In a press, platens having faces at an angle to each other, means for moving one toward the other, and pressing heads or platens arranged to press the bale longitudinally, substantially as described.

14. In a press, platens having faces at an angle to each other, means for moving one toward the other, pressing heads or platens arranged to press the bale longitudinally, means for operating one of the platens, and means for operating one or both of the pressing heads, substantially as described.

15. In a press with pressing surfaces at an angle to each other for pressing the bale, of means for operating them and means for automatically controlling the pressure on the bale, substantially as described.

16. In a press with pressing surfaces at an angle to each other for pressing the bale, of means for operating them and means for automatically controlling the pressure on the bale, and a pressing head or heads, substantially as described.

In testimony whereof I have signed my name to this specification in the presence of two subscribing witnesses.

SAMUEL J. WEBB.

Witnesses:
F. L. FREEMAN,
W. CLARENCE DUVALL.